(12) United States Patent
Thompson

(10) Patent No.: US 6,192,397 B1
(45) Date of Patent: Feb. 20, 2001

(54) METHOD FOR ESTABLISHING A MASTER-SLAVE RELATIONSHIP IN A PEER-TO-PEER NETWORK

(75) Inventor: Geoffrey O. Thompson, Palo Alto, CA (US)

(73) Assignee: Nortel Networks Limited, Montreal (CA)

( * ) Notice: Under 35 U.S.C. 154(b), the term of this patent shall be extended for 0 days.

(21) Appl. No.: 08/858,776

(22) Filed: May 19, 1997

Related U.S. Application Data

(60) Provisional application No. 60/020,106, filed on Jun. 20, 1996.

(51) Int. Cl.[7] ................................................ G06F 15/16
(52) U.S. Cl. .................................... 709/209; 709/222
(58) Field of Search .................... 395/200.38, 200.39, 395/200.5, 200.49, 200.4, 200.57, 200.52; 370/461; 364/132

(56) References Cited

U.S. PATENT DOCUMENTS

| | | | |
|---|---|---|---|
| 4,488,232 | * 12/1984 | Swaney et al. | 364/200 |
| 4,543,574 | * 9/1985 | Takagi et al. | 340/825.5 |
| 4,630,264 | * 12/1986 | Wah et al. | 370/85 |
| 5,729,686 | * 3/1998 | Heck et al. | 395/200.38 |

* cited by examiner

Primary Examiner—Dung C. Dinh
(74) Attorney, Agent, or Firm—Blakely Sokoloff Taylor & Zafman LLP

(57) ABSTRACT

A system is provided for establishing a master-slave relationship at the physical layer between a first device and a second device in a peer-to-peer network. The system generates a first information which is associated with the first device. A second information is generated and associated with the second device. The first information is compared with the second information to generate a comparison result. Based on the comparison result, one device is designated as a master and the other device is designated as a slave.

20 Claims, 5 Drawing Sheets

METHOD FOR ESTABLISHING A MASTER-SLAVE RELATIONSHIP IN A PEER-TO-PEER NETWORK

This application claims benefit to provisional application 60/020,106 filed Jun. 20, 1996.

BACKGROUND OF THE INVENTION

1. Field of the Invention

The present invention relates to the field of data communications. In particular, the present invention provides a system for establishing a master-slave relationship, at the physical layer, on a point-to-point link in a peer-to-peer network.

2. Background

Peer-to-Peer networks utilize a communication protocol such as Carrier Sense Multiple Access/Collision Detection (CSMA/CD). The philosophy of this type of network is that every device coupled to the network determines, on an independent basis, when to send information to another device coupled to the network. To summarize this process, when a device has data for transmission to another device on the network, the device checks the medium across which it intends to transmit the data for any existing traffic. If the device senses traffic on the medium, it waits until the medium is free of traffic before initiating transmission of its data. If the device does not sense traffic on the medium, then it attempts to send data across the network to the other device. If the sending device detects a collision during the transmission, it suspends transmission and waits a randomly chosen amount of time before attempting to resend the data by repeating the above process.

As the utilization of a peer-to-peer network increases, the number of collisions on the network increases, thereby reducing the overall throughput of the network. To address this problem, technology has developed various types of hardware capable of higher data transmission rates and has developed more efficient network software. Higher data transmission rates reduce the time period during which the data is on the medium for a given amount of data, thereby reducing the probability of a collision with data from another device.

Network software typically includes several layers of protocol. For example, in an Ethernet local area network, the network interface comprises: the physical layer, the media access control sublayer and the logical link control sublayer. The physical layer's function is to take data packets given to it from the media access control layer and place the packets on the medium to be delivered to a destination device. The carrier sense, collision detection functions to support the arbitration of access to the medium by the attached device.

Each device in a peer-to-peer network is a peer to other devices in the network. Thus, no device is considered to be "superior" to any other device on the network. As such, a master-slave relationship between devices is not typically supported in a peer-to-peer network environment. It is therefore desirable to provide a system capable of establishing a master-slave relationship (when such need arises), at the physical layer, on a point-to-point link in a peer-to-peer network.

SUMMARY OF THE INVENTION

The present invention provides improved performance in a peer-to-peer network by permitting the establishment of a master-slave relationship between any two devices at each end of a point-to-point link. By establishing a master-slave relationship, the master may provide control signals or other data to the slave for use by the slave.

An embodiment of the present invention provides a system for establishing a master-slave relationship at the physical layer between a first device and a second device in a peer-to-peer network connected by a point-to-point link. The system generates a first information which is associated with the first device. Additionally, a second information is generated which is associated with the second device. The first information is compared with the second information to generate a comparison result. Based on the comparison result, one device is designated as a master and the other device is designated as a slave.

Another feature of the invention provides that the generation of the first information and the second information is performed by the first device and second device, respectively.

A specific aspect of the invention transmits the first information from the first device to the second device and transmits the second information from the second device to the first device. Each device then compares the first information to the second information to determine which device is master and which device is slave. Since each device has the same data and the same criteria, their determination is expected to agree.

An embodiment of the invention assigns a particular value to each device. If the assigned values are unequal, then the assigned values are used to determine which device is master and which device is slave. If the assigned values are equal, then the first device selects a first random number and the second device selects a second random number. The first selected number is compared with the second selected number to generate a comparison result. Based on the comparison result, one device is designated as master and the other device is designated as slave.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

Figure 1:
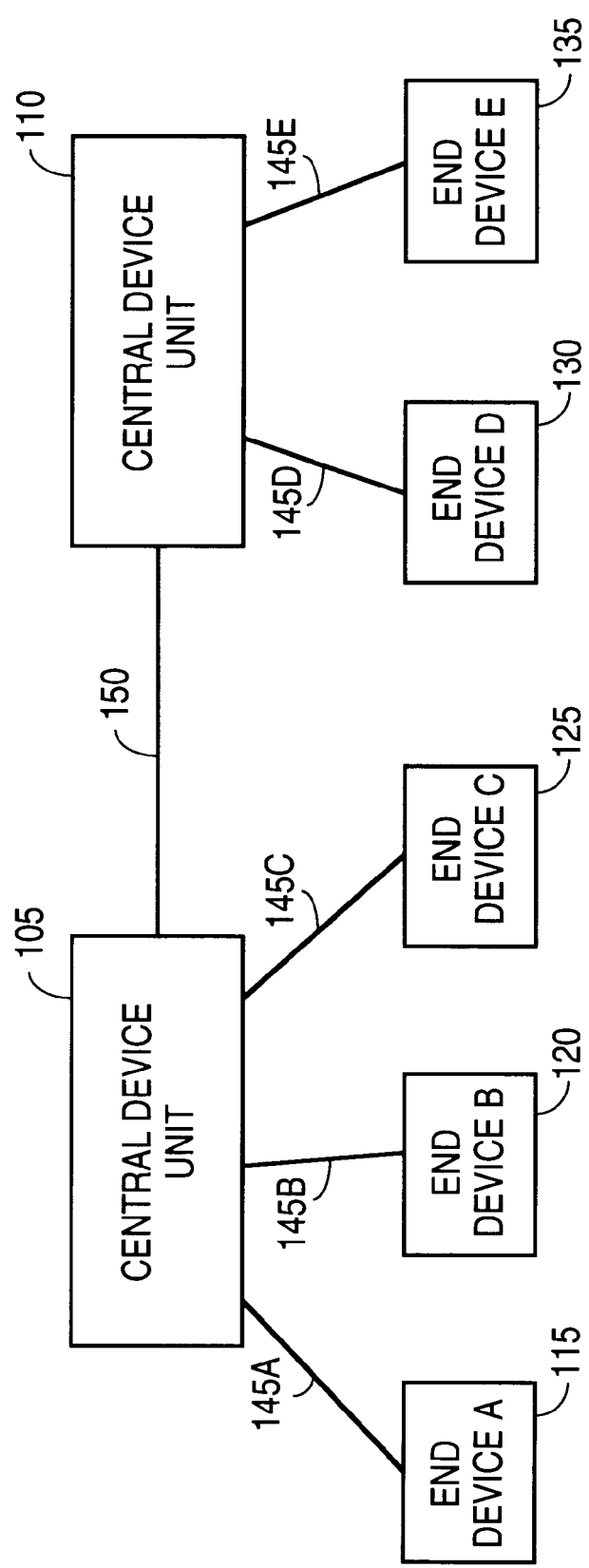
FIG. 1 illustrates an exemplary network structure upon which the present invention can be implemented.

The following detailed description sets forth numerous specific details to provide a thorough understanding of the invention. However, those skilled in the art will appreciate that the invention may be practiced without these specific details. In other instances, well-known methods, procedures, components, and circuits have not been described in detail so as not to obscure the invention. Referring now to the drawings, in which like numerals represent like elements throughout the several figures, aspects of the present invention and the preferred operating environment will be described.

The present invention provides a system for establishing a master-slave relationship, at the physical layer, on a point-to-point link in a network. Thus, one device on the point-to-point link is designated a master and the other device is designated a slave. This master-slave relationship may be used to provide control signals, clock signals, or other data from the master to the slave.

In a particular example, the master-slave relationship may be used to provide a clock loopback function on a point-to-point link between the master device and the slave device. The clock loopback function allows higher data transmission rates, thereby reducing the probability of collisions. If one of the devices or ends on the link is designated as a master and the other as a slave at the physical layer, then the master can provide the clocking mechanism for both devices while the slave loops the clock signal back to the master. This configuration allows higher transmission rates on cabling that previously could not transmit data at these rates because of a high noise-to-signal ratio (due to the poor signaling characteristics of the wire). Additional details regarding clock loopback is provided below with reference to FIG. 5.

FIG. 1 depicts an exemplary network in which an embodiment of the present invention may be implemented. The network includes several End Devices 115, 120, 125, 130, and 135 (also referred to End Devices A through E, respectively). The End Devices may be any device capable of being coupled to a network, such as computer workstations. The End Devices 115–135 are connected to Central Device Units 105 and 110 using point-to-point links 145a–145e. Each Central Device Unit 105, 100 may also be coupled to one or more additional Central Device Units, thereby interconnecting all of the devices coupled to the Central Device Units. Although not shown in FIG. 1, End Devices may also be coupled directly to one another.

An example of transmitting data on the network of FIG. 1 is as follows: End Device A has data to transmit to End Device E. To accomplish this transmission, End Device A transmits data along link 145a to Central Device Unit 105. Central Device Unit 105 then transmits the data across link 150 to Central Device Unit 110. Central Device Unit 110 transmits the data along link 145e to the its destination at End Device E.

The present invention permits the establishment of a master-slave relationship between any two devices on a point-to-point link in a network. This includes the link between any of the Central Device Units and an End Device (links 145a–145e), between two End Devices (link not shown) or between two Central Unit Devices (link 150). A device in the context of this specification will be defined as either an End Device or a Central Device Unit that connects the end devices. Furthermore, although only five End Devices and two Central Device Units are shown, this is only for discussion purposes since any number of End Devices and Central Device Units may be incorporated into the network. In a particular embodiment of the invention, the End Devices and the Central Device Units are part of an Ethernet local area network (not shown).

Figure 2:
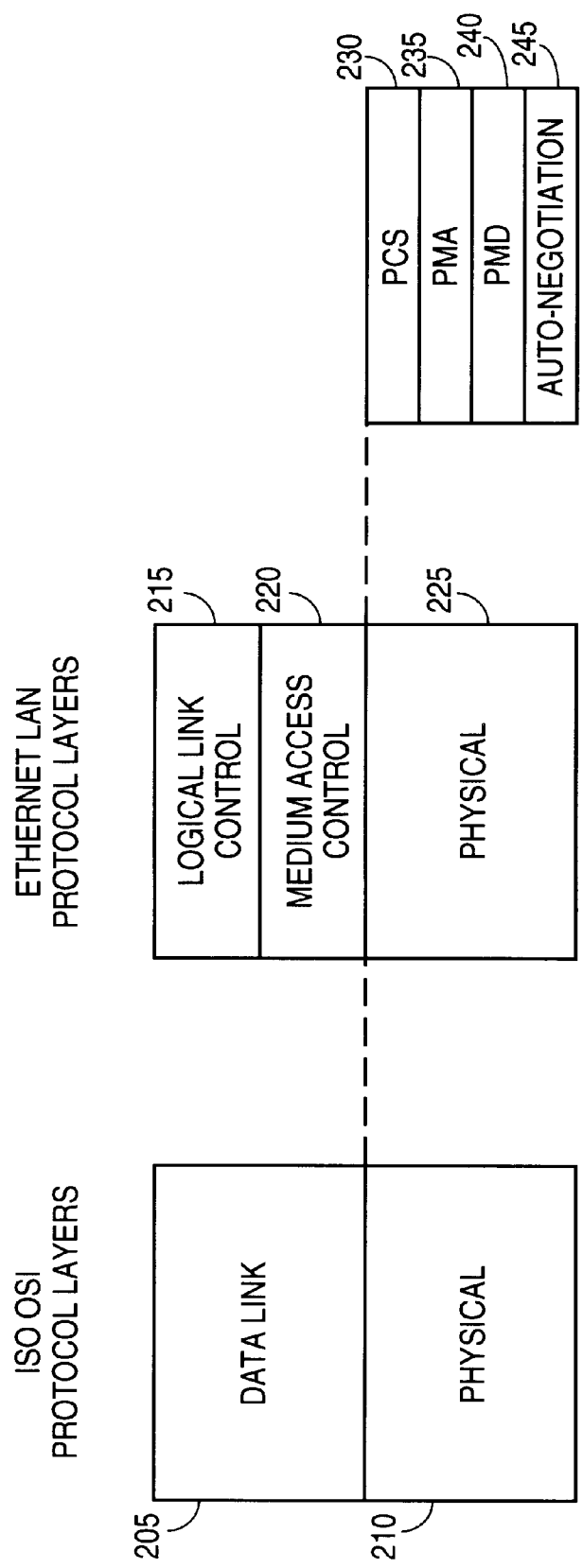
FIG. 2 illustrates a comparison of protocol layers between the ISO standard and the IEEE 802.3 standard.

FIG. 2 depicts a comparison of protocol layers between the International Standards Organization Open Systems Interconnect (ISO OSI) and Institute of Electrical and Electronic Engineers, Inc. (IEEE) 802.3 data communication standards as well as a breakdown of the physical layer in IEEE Std 802.3u—1995. FIG. 2 depicts two of the ISO OSI layers, the physical layer 210 and the Data Link layer 205. These are the two layers that perform the services required within a local area network. FIG. 2 also illustrates the comparable IEEE 802.3 protocol layers, commonly referred to as Ethernet, comprising: the Logical Link Control sublayer 215; the Media Access Control sublayer 220; and the Physical layer 225.

The Ethernet protocol layers are defined by a standard developed by IEEE and promulgated as IEEE 802.3. In IEEE 802.3u, the physical layer is divided into the following sublayers: the Physical Coding sublayer (PCS) 230; the Physical Medium Attachment sublayer (PMA) 235; the Physical Medium Dependent sublayer (PMD) 240; and the Auto-Negotiation sublayer 245. In one embodiment of the invention, the Auto-negotiation sublayer of IEEE 802.3 is utilized to perform the functions described below. This Auto-Negotiation sublayer provides a service within the physical layer for devices to detect the modes of operation supported by a device at the other end of a point-to-point link, determine common abilities and configure joint operation. Using the Auto-Negotiation sublayer, devices may establish services to each other that other devices on the network need not be aware of or even support. For additional information regarding IEEE 802.3 and the Auto-Negotiation sublayer, refer to "Media Access Control (MAC) Parameters, Physical Layer, Medium Attachment Units and Repeater for 100 Mb/s Operation," IEEE Std 802.3u—1995, Clause 28.

A clocking loopback function may be provided at the physical layer to make digital signal processing (DSP) more efficient, thereby allowing higher data transmission rates on cables or wires not previously capable of handling these rates. By looping back the same clock signal, both the master device and the slave device use the same clock signal. This common clock improves the ability of the DSP circuits to remove noise from the signals and, therefore, improve the flow of data. Noise removal is especially important when transmitting signals at high speed across lower quality wires or cabling; i.e., wires or cabling having a higher noise-to-signal ratio.

In a specific example, the present invention may be used in networks having previously installed cables or wires that are otherwise unable to take advantage of higher transmission rates due to the poor, or low quality, signaling characteristics of the cabling or wire. Prior to the present invention, users or administrators of these networks wishing to improve transmission rates may be required to install new cables or wires at considerable expense. In addition to the cost of the new wire or cable itself, the cable may be required to be installed in existing walls or structures. By using the invention described herein, existing cables having a poor transmission quality may be used without requiring the installation of new, higher quality, wires or cables.

Figure 5:
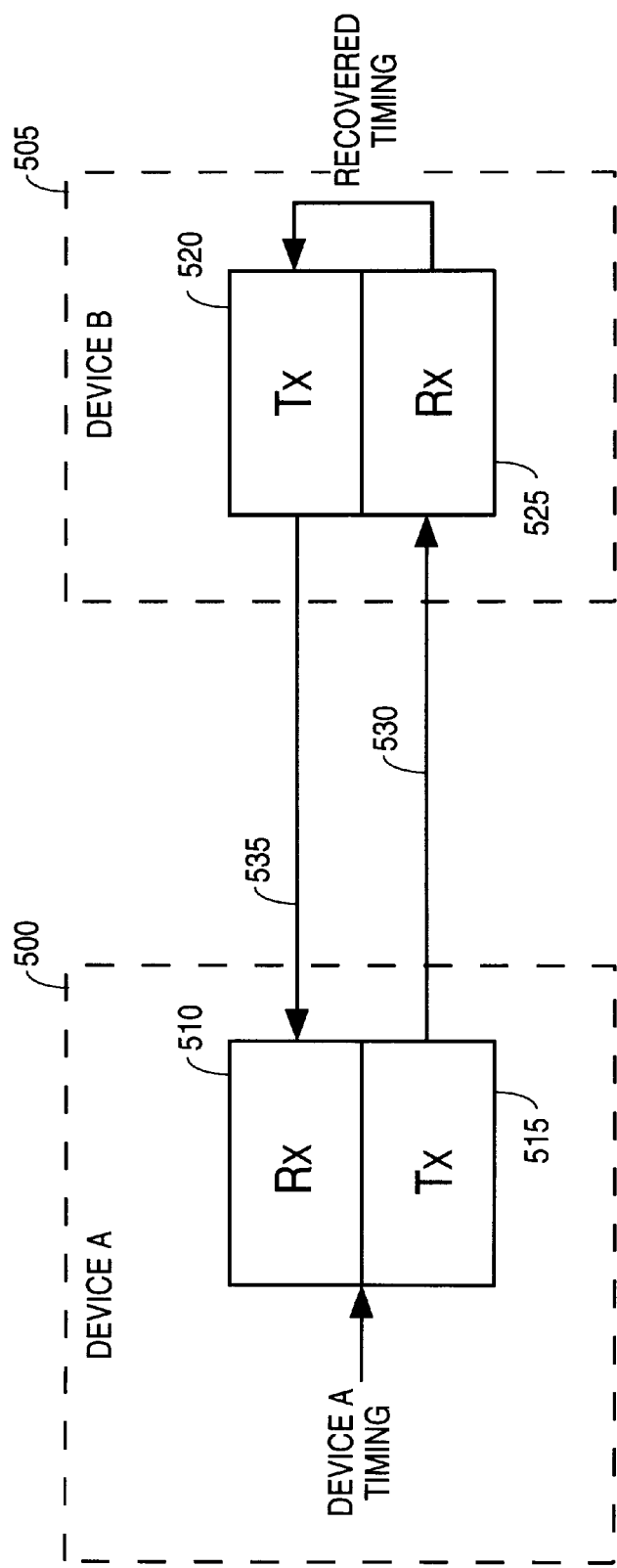
FIG. 5 illustrates a pair of devices coupled to provide a clock loopback function.

FIG. 5 depicts a clock loopback function where a Device 500 ("Device A") is designated as the master and Device 505 ("Device B") is designated as the slave. Device A generates, or receives from an external source, its timing signal (clock signal). Device A uses this clock signal to transmit data using a Transmitter 515 across link segment 530 to Device B. A Receiver 525 in Device B receives Device A's data on link segment 530. Device B then loops back the clock signal received from Device A and uses Device B's Transmitter 520 to transmit it's data to Device A across link segment 535. Device A's Receiver 510 receives data with the clock signal used by Device A's Transmitter 515. Since Device A and Device B have established a master-slave relationship, both devices know which device will be using their own clock signal and which device will be looping back the other's clock signal.

Link segments 530 and 535 shown in FIG. 5 illustrate two separate data flows in opposite directions. This arrangement may be accomplished by using a multi-conductor twisted-pair cable or a fiber optic pair. Those skilled in the art will appreciate that various other types of wires and cables may be used as link segments 530 and 535 in FIG. 5.

Figure 3:
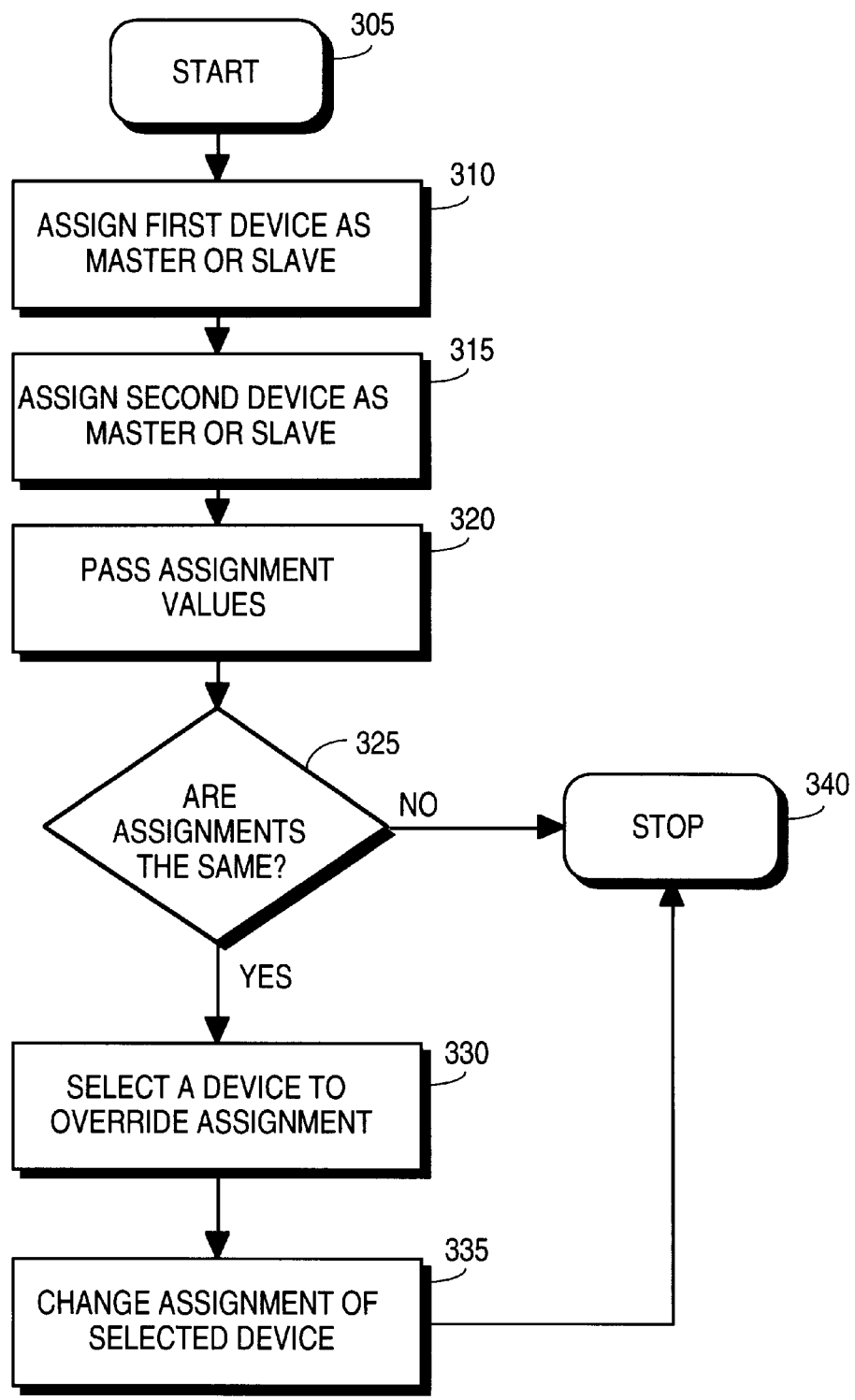
FIG. 3 is a flowchart illustrating a method for designating one device as a master and one device as a slave.

FIG. 3 illustrates a procedure for designating one device as a master and one as a slave. The method of FIG. 3 starts at step 305 and continues to step 310 where the first device is assigned as a master or a slave. The procedure then continues to step 315 where the second device is assigned as either a master or slave.

In one embodiment of the invention, the assignments in steps 310 and 315 are performed during each device's initialization to the network. For example, as End Device A (FIG. 1) begins an initialization sequence to add itself to the network, End Device A sets itself as a master or a slave based on its default designation. This default designation as master or slave may be based on a preassigned status set within the device. This default designation may be modified by the network administrator. When Central Device Unit 105 is initialized, it sets itself as a master or slave based on its default designation.

Following the assignment as master or slave to both of the devices, the procedure of FIG. 3 continues at step 320 where the first device and the second device pass their assigned values to each other. In essence, each device transmits its default designation to the other device.

At step 325, having passed assigned values, a comparison is performed to determine if there is a conflict (i.e., both devices assigned as slaves or both devices assigned as masters). This comparison may be performed by both devices simultaneously.

If the assignments are not the same at step 325, the procedure stops at step 340 at which time the devices will continue with their network initialization or begin communicating in the standard network environment. Otherwise, the procedure continues to step 330 where one of the devices is selected to change its assignment. Additional details regarding the changing of assignments is provided below with respect to FIG. 4. After selecting the device assignment to override at step 330, step 335 continues by changing the assignment of the selected device such that it is different from the other device's assignment. The procedure of FIG. 3 then stops at step 340, and permits the devices to continue network initialization and begin regular network communication.

Figure 4:
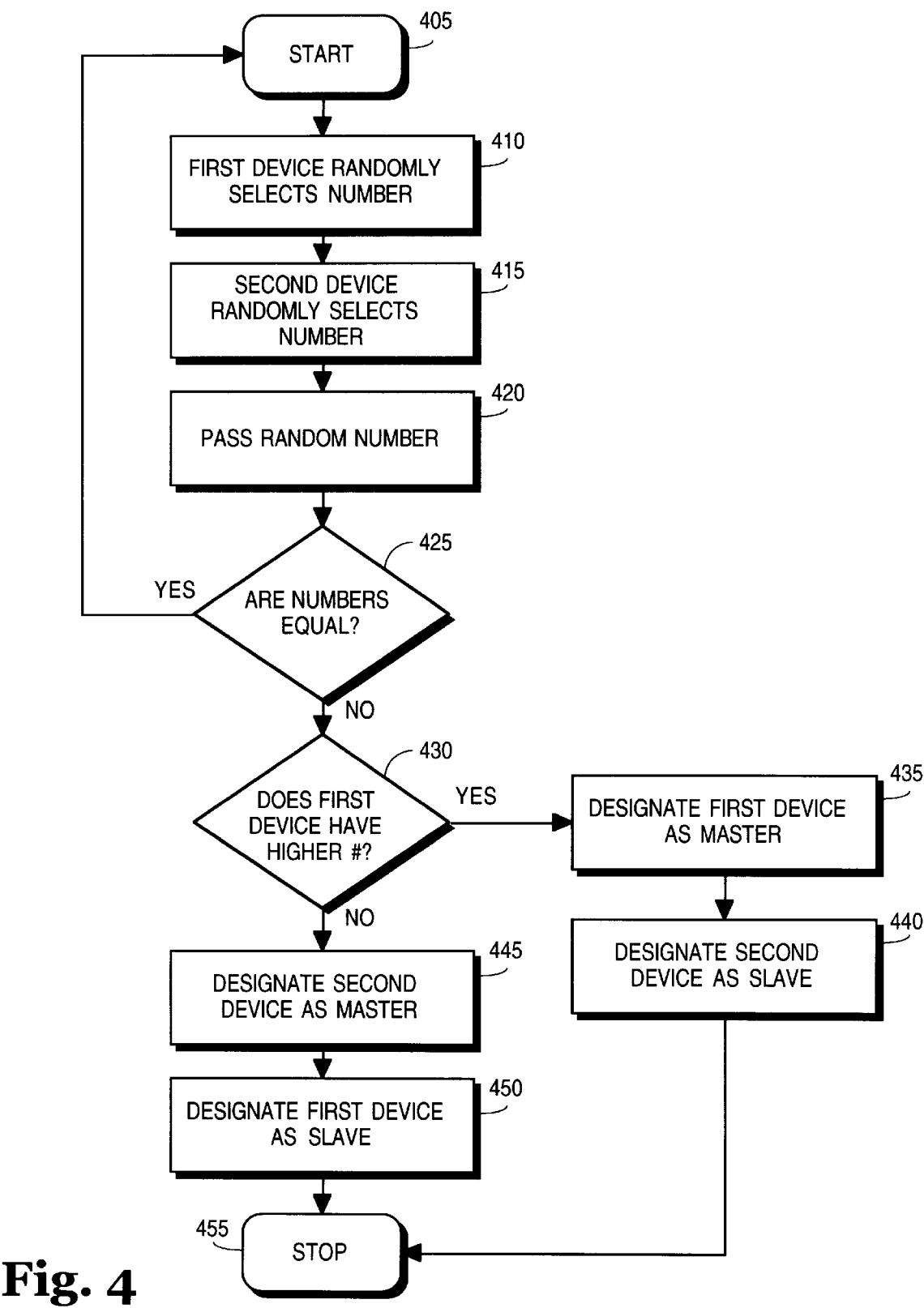
FIG. 4 is a flowchart which more specifically illustrating a method for overriding a device's assigned designation as master or slave.

FIG. 4 illustrates in greater detail the selection and changing procedure steps (330 and 335) of FIG. 3. The procedure of FIG. 4 starts at 405. At this point there has already been a determination that a conflict exists in the assignment of master and slave status to the two devices. To resolve the conflict, the procedure continues to step 410 where the first device randomly selects (or generates) a number or other information. At step 415, the second device randomly selects (or generates) a number or other information. The first and second random numbers must be independent from one device to another to prevent the two devices from generating the same series of random numbers. Additionally, the random numbers are preferably selected such that it is equally likely that either device will be selected as master. These random number selections may be generated by any process available to the device.

A particular embodiment of the invention is described as generating random numbers to determine which device assignment will be overridden. However, those skilled in the art will appreciate that tokens or other information may be generated by each device and compared to determine which device assignment is overridden. Any token or information may be used, provided that the tokens or information may be distinguished from one another using a comparison mechanism.

The maximum value of the random number (e.g., number of bits) is a design choice recognizing that the larger the number the less probability that both numbers will be the same. Consequently, the larger the number, the more time and resources will be devoted to handling this random function as it will need to be transmitted to the other device. For example, one may not want to choose to design a random number that takes up four bytes of data because this data will need to be transferred to the other device and four bytes will take up more transmission time than a one byte random number. Similarly, one may not want to choose a random number that only takes up one bit because this increases the probability of both devices generate the same random number.

After both devices have selected a random number, the method continues to step 420 where both devices transmit their random number to the other device. At step 425, both devices compare the two random numbers. If the random numbers are equal, then the method repeats steps 410 through 425. If the random numbers are not equal, then, at step 430, both devices determine which device had the higher number. If the first device has a higher number, it's designated as master at step 435, regardless of how it was initially assigned. In this situation, the second device is designated as slave at step 440, regardless of how it was initially assigned.

If, at step 430, the first device was not higher than the second device, then the procedure continues to step 445 where the second device is designated as master and the first device is designated as slave. Again the designations in step 445 and 450 are performed regardless of how the devices were initially assigned.

One embodiment of the present invention includes using the Auto-Negotiation sublayer of the IEEE 802.3u standard. Referring to the network shown in FIG. 1, End Device A is added to the network so that it can communicate with the other network devices. Once the medium 145a is connected, End Device A begins to initialize itself onto the network. As part of the initialization process of IEEE 802.3u to establish the physical link, the Auto-Negotiation sublayer in the End Device A and Central Device Unit 105 will each transmit Fast Link Pulse (FLP) bursts on the link between the two devices. Within these FLP bursts include bits which allow devices to transmit operational modes supported by the devices. In this example, within a FLP burst, a device will set bits signifying whether it can support a master-slave function, whether its default designation is a master or slave and several bits devoted to a random number in case of a conflict arises where both devices' default designations are the same (i.e., both devices are designated as preferring master or preferring slave).

If a master-slave relationship is to be developed between End Device A and Central Device Unit 105, both devices send one or more FLP bursts to the other, carrying the information designated above. Therefore, End Device A and Central Device Unit 105 each have a complete set of information from both devices including whether both devices can support the master-slave function, the other device's default designation, and each other's random number. This information is used to resolve any conflicts in the default designation. Therefore, if either device lacks the ability to support a master-slave relationship, then no such relationship is established. If, on the other hand, both End Device A and Central Device Unit 105 have the master-slave function bit set, signifying that each device supports the master-slave function, but the devices have different defaults (i.e., one is a master and the other is a slave) then each device uses its default designation.

However, if both devices support the master-slave relationship and both devices have the same default designation, then they compare their own random number with the random number sent from the other device in the FLP burst, and the device with the highest value becomes the master and the device with the lower value becomes the slave. If the random numbers are the same, another random number is generated by each device and sent to the other in another FLP burst. Another comparison is performed and the procedure continues until the random numbers are not equal and a master and a slave has been established.

From the above description and drawings, it will be understood by those skilled in the art that the particular embodiments shown and described are for purposes of illustration only and are not intended to limit the scope of the invention. Those skilled in the art will recognize that the invention may be embodied in other specific forms without departing from its spirit or essential characteristics. References to details of particular embodiments are not intended to limit the scope of the claims.

What is claimed is:

1. A method comprising the steps of:
   (a) generating a first information associated with a first device;
   (b) generating a second information associated with a second device;
   (c) comparing the first information with the second information by the first device and the second device, the comparison operation generating a comparison result;
   (d) designating one device as a master and one device as a slave in response to the comparison result;
   (e) receiving by the slave a clock signal from the master; and
   (f) returning the clock signal from the slave to the master.

2. The method of claim 1, wherein the step of generating a first information associated with the first device is performed by the first device.

3. The method of claim 1, wherein the step of generating a second information associated with the second device is performed by the second device.

4. The method of claim 1, wherein the step of generating a first information associated with the first device is performed by the first device and the step of generating a second information associated with the second device is performed by the second device.

5. The method of claim 4, wherein the step of comparing the first information with the second information includes:
   transmitting the first information from the first device to the second device;
   transmitting the second information from the second device to the first device; and
   generating a comparison result in each device by having each device compare the first information and the second information.

6. A method for establishing a master-slave relationship at the physical layer between a first device and a second device in a peer-to-peer network, the method comprising the steps of:
   (a) generating a first random number associated with the first device;
   (b) generating a second random number associated with the second device;
   (c) comparing the first random number with the second random number;
   (d) repeating steps (a), (b), (c) if the first random number is equal to the second random number;
   (e) designating the device with the higher associated random number as a master device; and
   (f) designating the device with the lower associated number as a slave device;
   (g) receiving by the slave device a clock signal from the master device; and
   (h) returning the clock signal from the slave device to the master device.

7. The method of claim 6, wherein the step of generating a first random number associated with the first device is performed by the first device.

8. The method of claim 6, wherein the step of generating a second random number associated with the second device is performed by the second device.

9. The method of claim 6, wherein the step of generating a first random number associated with the first device is performed by the first device and the step of generating a second random number associated with the second device is performed by the second device.

10. The method of claim 9, wherein the step of comparing the first number with the second number includes:
    transmitting the first number from the first device to the second device;
    transmitting the second number from the second device to the first device; and
    generating a comparison result in each device by having each device compare the first and second numbers.

11. A method for establishing a master-slave relationship at the physical layer between a first device and a second device in a peer-to-peer network, the method comprising the steps of:
    (a) assigning a first value associated with the first device;
    (b) assigning a second value associated with the second device;
    (c) determining whether the first assigned value and the second assigned value are equal;
    (d) designating one device as a master device and the other device as a slave device in response to their assigned values if the first assigned value is not equal to the second assigned value;
    (e) designating one device as a master device and the other device as a slave device if the first assigned value is not equal to the second assigned value by performing the following steps:
    generating a first random number associated with the first device;
    generating a second random number associated with the second device;
    comparing the first random number with the second random number and generating a comparison result;
    designating one device as a master device and one device as a slave device in response to the comparison result;
    receiving by the slave device a clock signal from the master device; and
    returning the clock signal from the slave device to the master device.

12. The method of claim 11, wherein the step of assigning the first assigned value and the step of assigning the second assigned value are performed during an initialization of each device.

13. The method of claim 11, wherein the step of generating a first random number associated with the first device is performed by the first device.

14. The method of claim 11, wherein the step of generating a second random number associated with the second device is performed by the second device.

15. The method of claim 11, wherein the step of generating a first random number associated with the first device is performed by the first device and the step of generating a second random number associated with the second device is performed by the second device.

16. The method of claim 15, wherein the step of comparing the first number with the second number includes:

transmitting the first number from the first device to the second device;

transmitting the second number from the second device to the first device; and generating a comparison result in each device by having each device compare the first and second numbers.

17. The method of claim 1, wherein the peer-to-peer network is an Ethernet.

18. A device comprising:

logic at a physical layer configured to (i) generate information that is retained within the device and transmitted to a remote device, (ii) compare the information to incoming information received from the remote device in order to determine a master-slave relationship between the device and the remote device and (ii) generate secondary information if the information is equal to the incoming information; and logic of the physical layer configured to (i) transmit a first clock signal to the remote device and (ii) receive the first clock signal returned from the remote device when the device is a master device.

19. The device of claim 18, wherein the information is a first random number, the incoming information is a second random number and the secondary information is a third random number.

20. The device of claim 18 further comprising:

logic of the physical layer configured to (i) receive a second clock signal from the remote device and (ii) return the clock signal to the remote device when the device is a slave device.

* * * * *